US011907245B2

(12) United States Patent
Beg et al.

(10) Patent No.: US 11,907,245 B2
(45) Date of Patent: Feb. 20, 2024

(54) PROCESSES AND SYSTEMS FOR DATAFLOW ROUTING BASED ON DATA TYPES AND TRANSFORMATIONS

(71) Applicant: VMware LLC, Palo Alto, CA (US)

(72) Inventors: Mirza Mohsin Beg, Foster City, CA (US); Leonid Ryzhyk, Sunnyvale, CA (US); Pooja Khandelwal, Pune (IN); Mihai Budiu, Sunnyvale, CA (US); Manish Roy, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/941,111

(22) Filed: Sep. 9, 2022

(65) Prior Publication Data

US 2024/0020313 A1 Jan. 18, 2024

(30) Foreign Application Priority Data

Jul. 14, 2022 (IN) .............................. 202241040501

(51) Int. Cl.
*G06F 16/00* (2019.01)
*G06F 16/25* (2019.01)
*G06F 16/2455* (2019.01)

(52) U.S. Cl.
CPC ...... *G06F 16/254* (2019.01); *G06F 16/24568* (2019.01); *G06F 16/256* (2019.01); *G06F 16/258* (2019.01)

(58) Field of Classification Search
CPC ..................................................... G06F 16/254
See application file for complete search history.

(56) References Cited

U.S. PATENT DOCUMENTS

2019/0081959 A1* 3/2019 Yadav .................... H04L 63/02

* cited by examiner

*Primary Examiner* — Ajith Jacob
(74) *Attorney, Agent, or Firm* — Quarles & Brady LLP

(57) ABSTRACT

A computer implemented processing service for efficient streaming of data input from one or more sources to one or more receivers is disclosed. The processing service includes a schema manager that receives commands from a tenant of the data stream processing service. The processing service includes a processing services gateway that validates the data and sends the data to a transformation processor. The transformation processor receives the data and parses the data into the one or more data formats in accordance with the instructions and sends the data in the one or more data formats to an egress service. The egress service outputs the data in the one or more data formats to the one or more receivers, each receiver receiving the data in a data pipeline in one of the one or more formats.

17 Claims, 16 Drawing Sheets

```
import json typedef InputData = InputData {
    sddc: SddcData
} typedef SddcData = SddcData {
    id: istring,
    timestamp: u64,
    collectionId: istring,
    datacenter: Datacenter
} typedef Datacenter = Datacenter {
                                name: istring,
                                id: istring,
                                networks: Set<Network>
                                } typedef Network = Network {
                                name: istring,
                                id: istring,
                                typ: istring,
                                vms: Set<VmData>
                                } typedef VmData = VmData {
                                id: istring,
                                name: istring,
                                state: istring,
                                powerState: istring,
                                backing: istring
                                }
```

FIG. 6A

```
                                            ┌─610
                        ┌612
    typedef SkylineData = SkylineData {objects: Vec<ManagedObject>}

┌typedef TopologyPayloadHeader = TopologyPayloadHeader {
615/     sourceId: istring,
         typ: istring,
         tenantId: istring,
         id: istring,
         timestamp: u64
    }

┌typedef ServiceInstance = ServiceInstance {
616/     typ: istring,
         id: string,
         name: istring
    }

┌typedef Datacenter = Datacenter {
617/     typ: istring,
         id: string,
         name: istring,
         networks: Vec<ManagedObjectRef>
    }
```

FIG. 6B

```
618 ── /* This pipeline has input from source */
       input stream VmcInputJson(json: string)

619 ── /* This pipeline produces output */
       output stream InsightsOutputJson(json: string)

620 ── /* Error stream to report parsing and conversion errors. */
       output stream Error(err: string)

/* Parse input JSON. */
621 ── stream ParsedData(result: Result<Ref<inputschema::InputData>, string>)
       ParsedData(from_json_string(json)) :- VmcInputJson(json).

622 ── /* Report parsing errors. */
       Error("Error parsing input json: " ++ err) :- ParsedData(Err{err}).

/* Stores successfully parsed datapoints. */
623 ── stream InputData(data: Ref<inputschema::InputData>)
       InputData(data) :- ParsedData(Ok{data}).

/* Results of converting data. */
624 ── stream ConversionResults(result: Result<Vec<outputschema::ManagedObject>, string>)
       ConversionResults(transform(data)) :- InputData(data).

625 ── // /* Report conversion errors. */
       Error("Error converting data: " ++ err) :- ConversionResults(Err{err}).

626 ── // /* Result of converting data to json. */
       stream OutSerializationResult(result: Result<string, string>)
       OutSerializationResult(data.to_json_string()) :-
           ConversionResults(Ok{data}).

627 ── // /* Report serialization errors. */
       Error("Error serializing output data: " ++ err) :- OutSerializationResult(Err{err}).

628 ── /* Output successfully converted objects. */
       InsightsOutputJson(json) :- OutSerializationResult(Ok{json}).
```

FIG. 6C

```
curl POST '<host-name>/dataflow' \
702 ──── --header 'Content-Type: application/json' \
     --data-raw '{
 703 ────"name": "demo-dataflow",
 704 ────"ingress-connector": {
  705 ────"pipeline": "demo-pipeline",
       "input-stream": {
           "module": "main",
      706 ────"name": "VmcInputJson"
       }
      },
 708 ────"egress-connectors": [{
  709 ────"name": "demo-dataflow-out1",
       "address": "http://host.docker.internal:5555/ingest",
  710 ────"pipeline": "demo-pipeline",
       "output-streams": [{
  711       "module": "main",
           "name": "InsightsOutputJson"
   712  }]
      }]                                    713
    }'
```

FIG. 7A

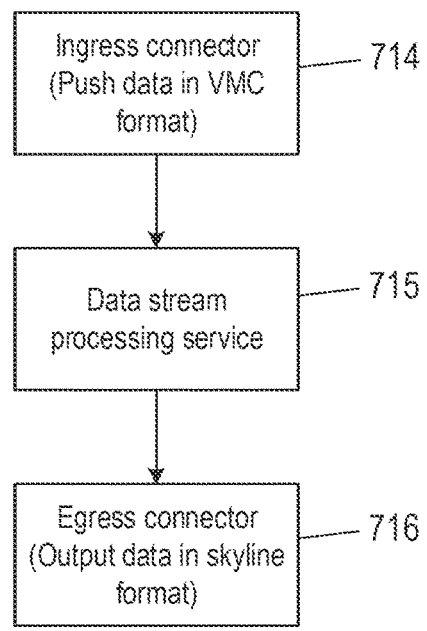

FIG. 7B

```
"egress-connectors": [{
    "name": "egress_1",
    "address": "<receiver>",
    "pipeline": "demo-pipeline",
    "output-streams": [{
        "module": "main",
        "name": "OutputJson_1"
    }]
},
{
    "name": "egress_2",
    "address": "http://host.docker.internal:5555/ingest2",
    "pipeline": "demo-pipeline",
    "output-streams": [{
        "module": "main",
        "name": " OutputJson_1"
    },
    {
        "module": "main",
        "name": " OutputJson_2"
    }]
}]
```

```
"auth-config": {
   "authConfigType": " CLIENT_CREDENTIAL",
   "client-id": "*************",
   "client-secret": "********************",
   "auth-url": "https://console-
   stg.cloud.vmware.com/csp/gateway/am/api/auth/
   authorize?grant_type=client_credentials"
}
```

FIG. 7E

```
"auth-config": {
   "authConfigType": "ACCESS_KEY",
   "access-key": "*********************"
}
```

FIG. 7F

```
{
   "name": "metrics-stream",           ── 728
   "interval-in-seconds": 60,
   "egress-connectors": [
                                        ── 729
      {
         "name": " metrics-stream-out1",
         "address": "<receiver>"
      }
   ]                                    ╲ 730
}
```

FIG. 7G

PROCESSES AND SYSTEMS FOR DATAFLOW ROUTING BASED ON DATA TYPES AND TRANSFORMATIONS

RELATED APPLICATIONS

Benefit is claimed under 35 U.S.C. 119(a)-(d) to Foreign Application Serial No. 202241040501 filed in India entitled "PROCESSES AND SYSTEMS FOR DATAFLOW ROUTING BASED ON DATA TYPES AND TRANSFORMATIONS", on Jul. 14, 2022, by VMware, Inc., which is herein incorporated in its entirety by reference for all purposes.

TECHNICAL FIELD

Processes and systems described herein relate to datacenters, and, in particular, to processes and systems that enable creation of dataflows in a data center.

BACKGROUND

Electronic computing has evolved from primitive, vacuum-tube-based computer systems, initially developed during the 1940s, to modern electronic computing systems in which large numbers of multi-processor computer systems, such as server computers, workstations, and other individual computing systems, are networked together with large-capacity data storage devices and networking devices to create geographically distributed data centers. Data centers are made possible by advances in computer networking, virtualization, distributed operating systems and applications, data-storage appliances, computer hardware, and software technologies. Data centers receive, store, process, distribute, and allow access over the internet to large amounts of data. Data centers now make up most of the computational and data storage resources used in cloud computing and cloud-based services. Cloud service providers maintain and operate data centers that are widely used by businesses, governments, and other organizations to store and process data, execute applications, and offer services to customers in the cloud.

Traditionally, organizations have relied on batch-oriented data pipelines to extract configuration data from multiple data sources, transform, or parse, the data into another data format, and load the transformed data ("ETL data pipelines") into a receiver, such as a data warehouse or an analytics service. During data extraction, raw data generated by a source is copied or exported from source locations to an intermediatory staging area explicitly or implicitly by using a persistent store for the data moving through the data pipelines. The sources can be, for example, SQL and NoSQL servers, email servers, search engine queries, and user activity streams from devices with applications that provide data streams, such as, for example, Facebook®, Instagram®, YouTube®, and Twitter®. ETL data pipelines store extracted data in a single batch and move the batch at scheduled periods of time or only once a certain amount of data has been collected. The transformation phase can include filtering, cleansing, de-duplicating, validating, and authenticating the data and performing calculations, translations, or summarizations of the data. In the loading phase, the transformed data is sent to the receiver. For most ETL data pipelines, the process is automated, often batch driven, and is performed in a dedicated service window, such as in the background or at night, to avoid conflicts with runtime service windows. ETL data pipelines are practical for processes that can tolerate latency of hours or even days before results of analysis become available. On the other hand, ETL data pipelines are typically not used with processes that require real time results and handle big data. For example, an online retailer that relies on an ETL data pipeline may fail to capture real time data that reveals how a short-term buying spree of a certain type of product was influenced by a celebrity endorsement. An offline overnight service window required for ETL data pipelines is not practical for processes that provide round the clock online services. In addition, as data volumes and data complexity continue to increase, ETL data pipelines often fail to finish within the dedicated service windows, causing ongoing performance issues and delays in results of analysis.

In recent years, streaming data pipeline services have enabled reliable collection, transformation, and analytics on large volumes of configuration and telemetry data in near real time. Numerous streaming data pipeline services are built by different cloud service providers. Each streaming data pipeline service is associated with a corresponding stream of data. However, separate streaming data pipeline services have caused duplication of services that has increased development and operational costs and increased long development cycles. In addition, traditional streaming data pipeline services do not have systems for many-to-many integration between different data telemetry collections, do not have standardized or shareable mechanisms for dynamically routing data from one source to multiple receivers, do not have standardized integration patterns, and do not have metadata, dictionaries or a model that describes how dataflows in a data pipeline. Instead, many cloud service providers deploy multiple separate data pipeline services in parallel. As a result, each data pipeline is internally operationalized, which has resulted in inefficiencies and adverse effects, such as proliferation of automated agents that collect and harvest overlapping data, increased data collection load on source systems, increased storage costs and build out of private data stores because of point-to-point collection/storage pairing, analytics and reinterpretation of data, and metadata and reconciliation challenges. Organizations seek an alternative to traditional streaming data pipeline services that are rigid, difficult to change, and do not support the constantly evolving data needs of organizations.

SUMMARY

Processes and systems described herein are directed to a computer implemented data stream processing service for streaming data input from one or more sources to one or more receivers. The processing service includes a schema manager that receives commands from a tenant of the data stream processing service. The commands contain instructions for parsing the data into one or more data formats and instructions for sending the data in each data format to one of the receivers. The processing service includes a processing services gateway that validates the data and sends the data to a transformation processor. The transformation processor receives the data and parses the data into the one or more data formats in accordance with the instructions and sends the data in the one or more data formats to an egress service. The egress service outputs the data in the one or more data formats to the one or more receivers, each receiver receiving the data in a data pipeline in one of the one or more formats.

DESCRIPTION OF THE DRAWINGS

FIGS. 6A-6C shows examples of schemas and instructions to execute a data transformation.

FIGS. 7A-7G shows examples of dataflows.

DETAILED DESCRIPTION

Data center tenants are organizations that purchase computational band width and data-storage services to run their applications and programs in virtual data centers ("VDCs") in cloud-computing facilities in much the same way customers purchase services from utility companies. A data center tenant can dynamically add and delete virtual computer systems from their VDCs in response to ever changing computational-bandwidth and data-storage needs rather than purchasing sufficient computer systems within a physical data center to handle peak computational-bandwidth and data-storage demands. Moreover, data center tenants can avoid the overhead of maintaining and managing their own physical computer systems, including hiring and periodically retraining information-technology specialists, and continuously paying for operating-system and database-management-system upgrades. Furthermore, cloud-computing facilities provide interfaces that allow tenants to configure VDCs and other functionalities.

Figure 1:
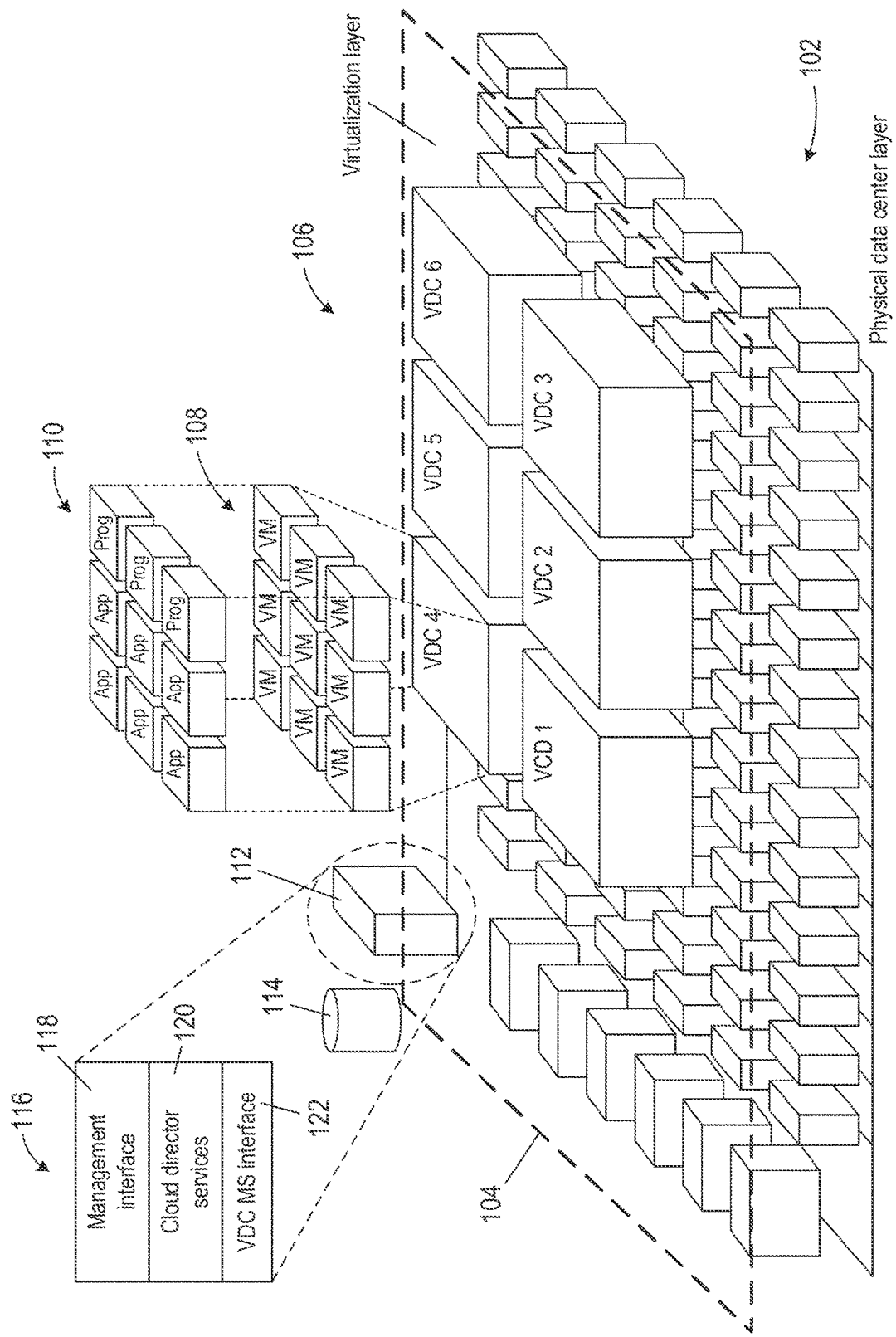
FIG. 1 shows examples of virtual data centers ("VDCs") abstracted to a virtualization layer above a physical data center.

FIG. 1 shows examples of VDCs. In FIG. 1, a physical data center 102 is shown below a plane 104 that represents separation between the physical data center 102 and a virtualization layer 106 of abstraction. The virtualization layer 106 contains six multi-tenant virtual data centers VDC 1, VDC 2, VDC 3, VDC 4, VDC 5, and VDC 6. Each VDC can be associated with a different data center tenant. Each VDC comprises several virtual machines ("VMs") that run a data center tenant's applications and programs. For example, FIG. 1 shows VDC 4 contains nine VMs 108 that run corresponding applications and programs 110. The resources of the multi-tenant virtual data centers are partitioned to provide secure VDCs to multiple tenants, or cloud-services-accessing organizations. Each of the VDCs is managed by a cloud director comprising a server computer 112 and an associated cloud-director database 114. The cloud-director server computer runs a cloud-director virtual appliance 116 that includes a cloud-director management interface 118, a set of cloud-director services 120, and a virtual-data-center management-server interface 122. The cloud-director services include an interface and tools for provisioning multi-tenant virtual data center virtual data centers on behalf of tenants, tools and interfaces for configuring and managing tenant VDCs, tools and services for managing the VDCs, and, services associated with template and media catalogs, and provisioning of virtualization networks from a network pool. A template for a VM contains an OS and/or one or more applications. Templates may include much of the detailed contents of VMs and virtual appliances, so that the task of configuring a VM or virtual appliance is significantly simplified. These templates are stored in catalogs within a tenant's VDC.

Figure 2:
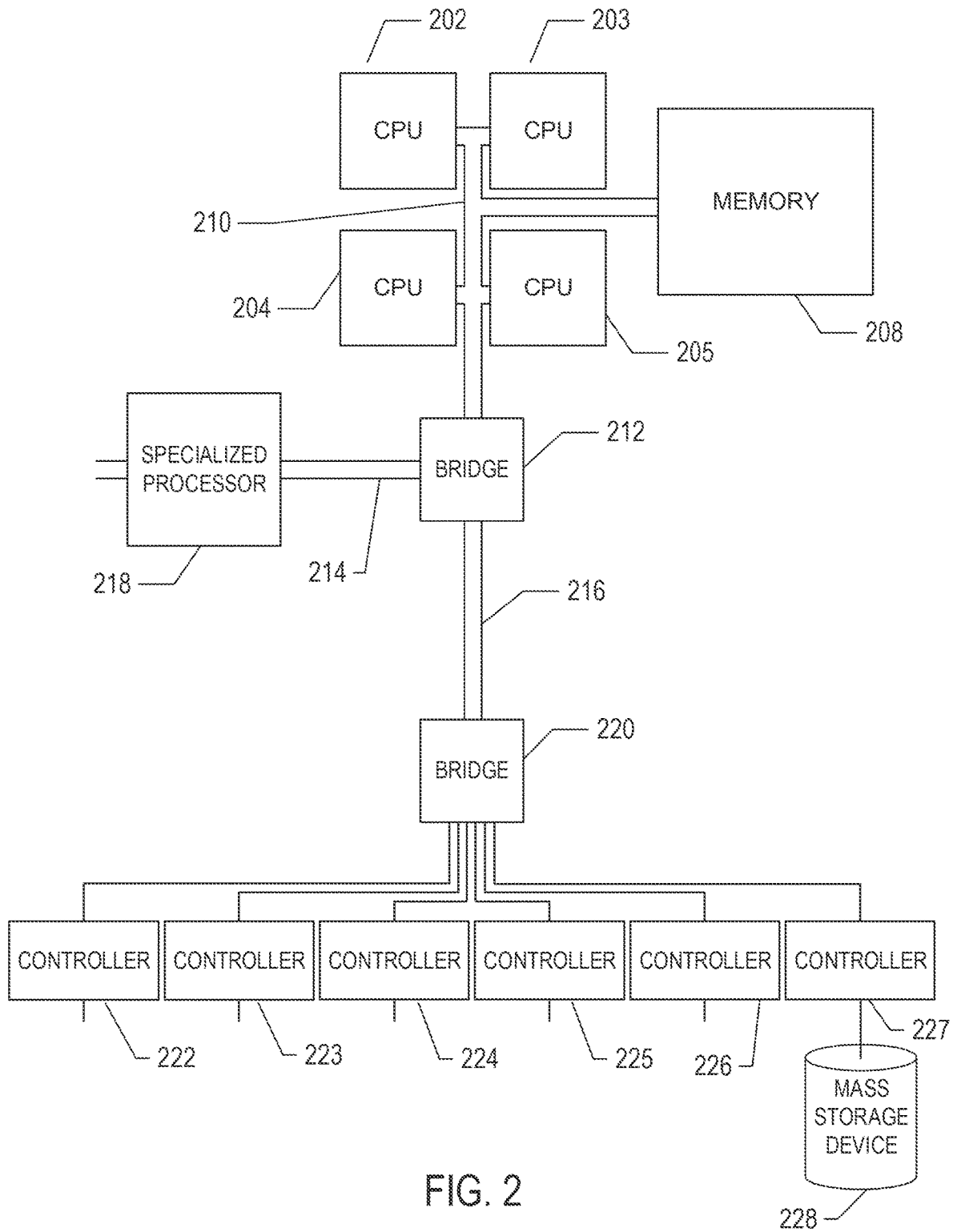
FIG. 2 shows an architectural diagram for various types of computers in a physical data center layer.

FIG. 2 shows an architectural diagram for various types of computers in the physical data center layer 102. The computer system contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. These busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of mass-storage devices 228, electronic displays, input devices, and other such components, subcomponents, and computational devices. It should be noted that computer-readable data storage devices include optical and electromagnetic disks, electronic memories, and other physical data storage devices.

There are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include various types of special-purpose computing devices, including data-storage systems, communications routers, network nodes, tablet computers, and mobile telephones.

The VDCs generate large volumes of configuration and telemetry data in real time. The cloud-director services enable reliable and secure cloud computing by collecting, transforming, and analyzing the large volumes of configuration and telemetry data in real time. Configuration data is data specific to a tenant's VDC configuration. Each service has an associated streaming data pipeline, composed of multiple messaging, compute, and storage technologies to process the large volumes of configuration and telemetry data in real time. As a result, typical cloud directors maintain multiple streaming data pipelines.

Figure 3:
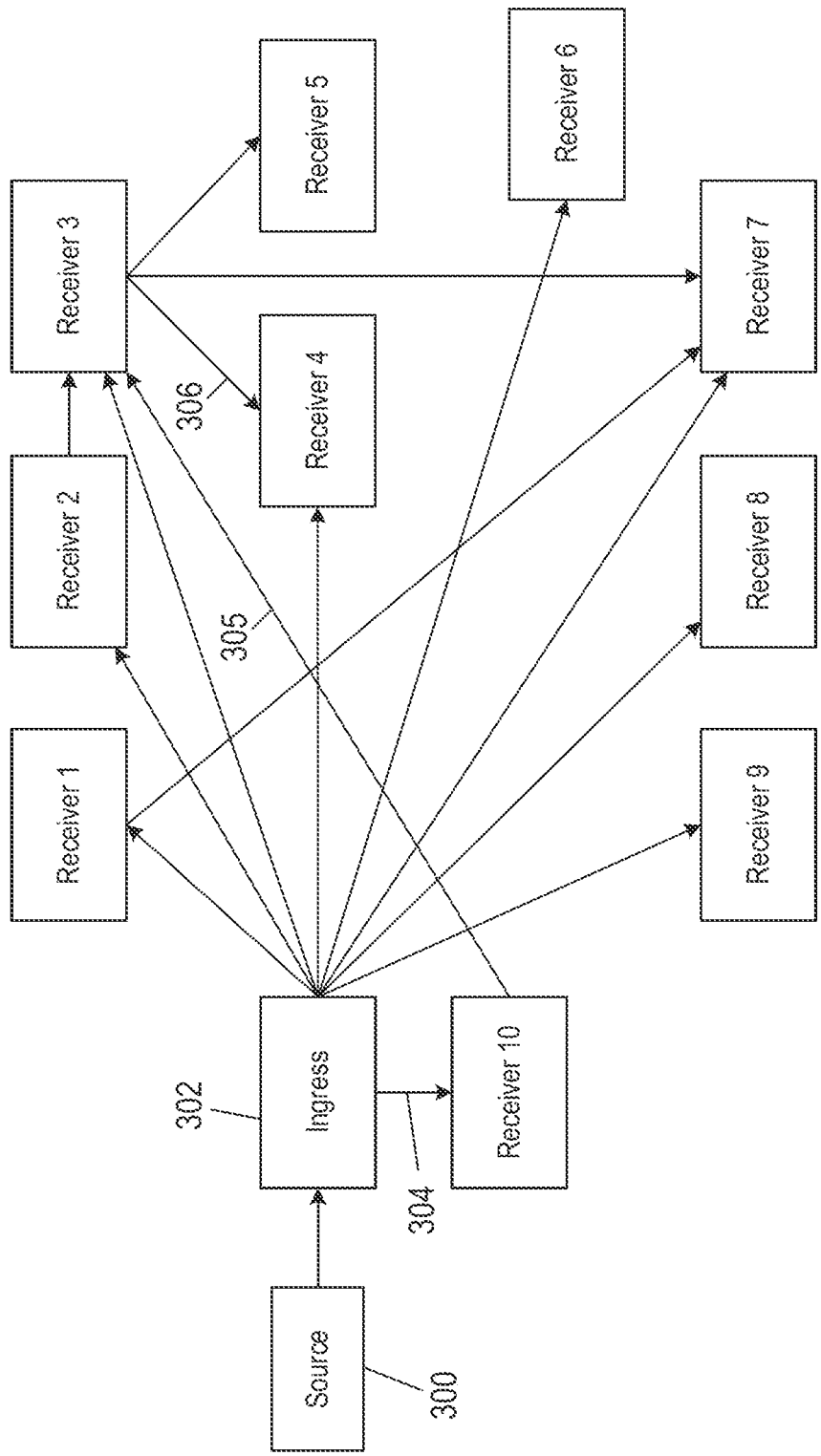
FIG. 3 shows an example of multiple streaming data pipelines for processing configuration data generated by a source.

FIG. 3 shows an example of multiple streaming data pipelines for processing configuration and telemetry data generated by a source 300. The source 300 can be a VDC or a VM, an application, or a program running in a VDC. In this example, ingress 302 receives the configuration data from the source 300. Rectangles identified as Receiver n, where n=1, 2, . . . , 9, represent different services performed on the data at different stages of the data pipelines. For example, Receiver 1 may represent a log analytics service that analyzes log messages, Receiver 9 may represent a data store that stores the data output from the source 300, Receiver 10 may represent embedded analytics that analyze certain metrics contained in the configuration data, and Receiver 6 may represent real-time metrics monitoring, and alerting, and a streaming analytics platform. Receivers connected by directional arrows represent the different streaming data pipelines. For example, directional arrows 304-306 represent a streaming data pipeline in which configuration data ingested by ingress 302 is first forwarded to Receiver 10 for processing according to the service provided by Receiver 10. Directional arrow 305 represents the output of Receiver 10 is input to Receiver 3 for processing according to the service provided by Receiver 3. Directional arrow 306 represents the output of Receiver 3 is input to Receiver 4 for processing according to the service provided by Receiver 4. Note that in this example ingress 302 outputs the ingested data into nine different streaming data pipelines. These nine different streaming data pipelines perform operations in parallel.

In FIG. 3, the separate streaming data pipelines are an example of the inefficient processing provided by a typical data processing service operating in a data center. The separate streaming data pipeline services cause duplication of services that leads to increased development and operational costs and increased long development cycles. For example, in FIG. 3, Receiver 3 is used in three separate streaming data pipelines. The streaming data pipeline services do not have standardized systems for many-to-many service integration between different data telemetry collections, do not have standardized or shareable mechanisms for dynamically routing data from one source to multiple services, do not have standardized integration patterns, and do not have a centralized metadata service that describes the dataflows, dictionaries or schemas that describe how dataflows in each data pipeline. Instead, in the example of FIG. 3, the cloud deploys multiple separate data pipeline services in parallel, which results in a proliferation of automated agents that collect, and harvest overlapping data and separately execute the services. For example, ingress 302 sends the same data in parallel to Receivers 1-10, which increases storage costs of private data stores because of point-to-point collection/storage pairing, analytics and reinterpretation of data, and metadata and reconciliation challenges.

Processes and systems described herein are directed to a programmable data stream processing service that allows one or more authenticated sources, such as but not limited to authenticated HTTP clients, to continuously push streams of configuration and telemetry data, called "input data," to receivers. Each receiver provides services to process data in a particular data format. The receivers provide services and have one or more consumers that continuously receive the transformed streams of data output from the receivers.

Figure 4:
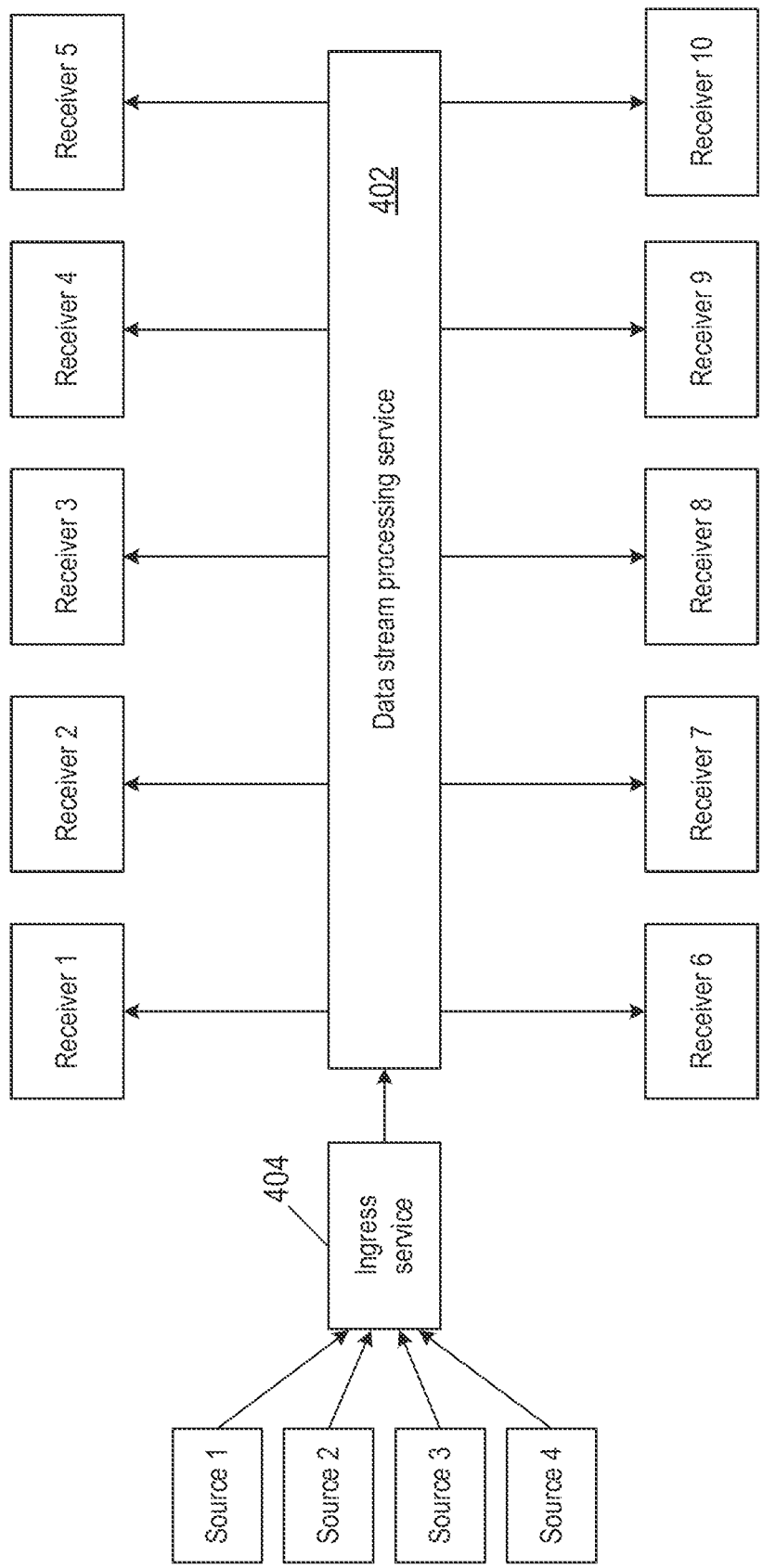
FIG. 4 shows an example of a programmable data stream processing service.

FIG. 4 shows an example of a programmable data stream processing service 402. The data stream processing service 402 provides standardized streaming data transformation and analytics streaming data pipelines that connect many data sources, which in this example are identified as Source m, where m=1, 2, 3, and 4, with many receivers identified as Receiver n, where n=1, 2, . . . , 10. The data stream processing service 402 receives input data from each of the sources and, in accordance with a programmed dataflow, sends the data to the receivers. The data stream processing service 402 connects the sources with the receivers by correlating data across different data types in different data streams; provides many sources to many receivers sharing data across applications, data stores, and analytical systems; provides data transformation across different data formats to minimize source/receiver integration retooling and adapters; provides continuous and incremental queries on the data in the streams; and provides queries and type-safe logic. Unlike the separately programmed data pipelines illustrated in FIG. 3, the programmable data stream processing service 402 is a system for reusable and shared many-to-many integration between different data telemetry systems. The service 402 is a mechanism for dynamically routing data from sources to receivers, provides integration patterns, and enables data center tenants to create schemas that validate the data coming from one or more sources and going to one or more receivers. A schema describes the shape of the data, such as the number of fields in a data record, and the schema describes the interconnections patterns of the data.

Figure 5:
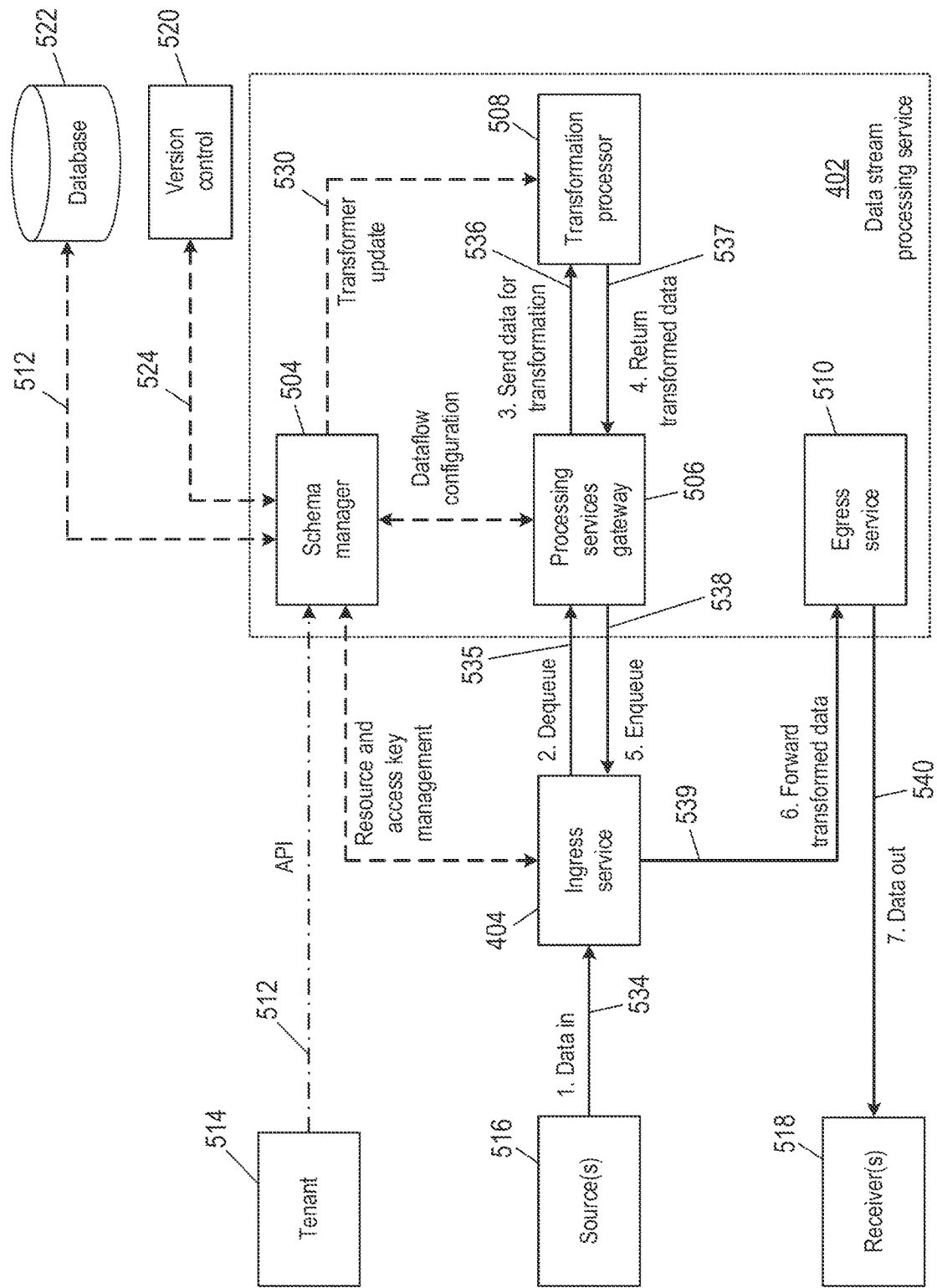
FIG. 5 shows an example architecture of the programmable data stream processing service shown in FIG. 4.

The programmable data stream processing service 402 enables data center tenants to create scalable and fault tolerant streaming data pipelines. FIG. 5 shows an example architecture of the programmable data stream processing service 402. Dotted rectangle 502 encompasses components of the programmable data stream processing service 402, which includes a schema manager 504, a processing services gateway 506, a transformation processor 508, and an egress service 510. Dash-dot arrow 512 represents API commands that are input by a data center tenant 514 to the schema manager 504. The APIs are used to input commands to the schema manager 504. Certain commands describe the schema of the streams of data. Other commands describe the transformation using a programming language. Still other commands describe the interconnections patterns of the data. FIGS. 6A-6B described below show examples of schemas. FIGS. 7A-7I described below are examples of interconnection patterns. The commands are instructions that set up a dataflow between one or more sources 516 of the input data (i.e., configuration and telemetry data) of the tenant 514 and one or more receivers 518 of transformed data (i.e., transformed configuration and telemetry data) produced by the transformation processor 508. Version control 520 manages different versions of the schemas created by the tenant 514. As the system evolves the structure of the data can change. The version control 520 can be used to store the transformation code and the interconnection patterns. Database 522 stores the different versions of the schemas created by the tenant 514. The schema manager 504 controls the dataflows executed by the ingress service 404, the processing services gateway 506, the transformation processor 508, and the egress service 510 based on the commands and APIs received from the tenant 514. Dashed line directional arrows represent information and instructions that are sent from the schema manager 504 to the ingress service 404, the processing services 506, the transformation processor 508, the database 522, and the version control 520. For example, the tenant 514 can create separate versions of schema that are stored in the database 522. The tenant 514 may input a command to use a particular schema on one day and a different schema on another day. Dashed directional arrows 524 and 526 represent instructions sent by the schema manager 504 to the version control 520 and the database 522 to retrieve the schemas from the database 522 and send the schemas to the schema manager 504. Directional arrow 528 represents resource quotas and access keys that are sent from the schema manager 504 to the ingress service 404. Access keys allow a tenant to access the system. Resource quotas is share of resources the tenant is permitted to use. The resource and access keys identify which of the sources 516 to accept configuration and telemetry data from. A resource quota is a limit on the amount of data the tenant 514 can send per unit time. An access key allows the tenant 514 permission to access the ingress service 404. The schema manager 504 sends updates represented by directional arrow 530 to data transformation engines, described below, of the transformation processor 508 in response to the transformation function and instructions to deploy the transformation function received from the tenant 514. The schema manager 504 sends the dataflow represented by directional arrow 532 to the processing services gateway 506.

The data stream processing service 402 creates a dataflow from the ingress service 404 to the egress service 510. A dataflow is a declarative steaming data pipeline that validates input data, transforms the input data, and routes the transformed data to one or more receivers. In other words, a dataflow is a declarative definition that defines how to connect, route, and transform (i.e., parse) data exchanged from remote sources to remote receivers. Each dataflow consists of a definition of one or more ingress connectors that connect to one or more sources of input data, an optional data schema validation step, one or more pipeline steps that convert the input data into transformed data, and finally one or more egress connectors that will receive the transformed data. One or more of the one or more egress connectors may send the transformed data to one or more receivers. The data stream processing service 402 enables a tenant to create and manage each dataflow by a name and not worry about managing or scaling the services that make the data physically flow between sources and receivers. The data stream processing service 402 enables a tenant to create and monitor any number of dataflows. The data stream processing service 402 internally manages buffering, automated backpressure management, and emits metering and monitoring throughput and latency of each dataflow.

The components of a dataflow include one or more ingress connectors, one or more egress connectors, schemas, and one or more data pipelines. An ingress connector specifies an input data stream and a data format to be received from a particular source. The tenant 514 defines as many ingress connectors as needed by their tenancy. The data format can be JSON, Avro, extensible markup language ("XML") or any other HTTP data format. The data stream processing service 402 performs validation and transformations of the HTTP data input to the service 402. An egress connector specifies an output data stream and a receiver that receives the output data stream. The data stream processing service 402 continuously posts transformed data to the egress connector. A tenant defines as many egress connectors as needed for their tenancy. An egress connector may be paired with a buffer. For example, each egress connector may be paired with a unique consumer group for an underlying Kafka topic. A Kafka topic is a category/feed name to which data is stored and published. Producer applications write data to topics and consumer applications read from the topics. The schemas contain the details of a data structure, such as the name of the data structure, primitive data type, and indication of whether each field of the data must appear (i.e., field of data is mandatory or optional) or whether each field appears multiple times (i.e., multiplicity of the data field). The tenant 514 defines a schema that contains the details of the data structure to be received by the ingress connectors. The tenant 514 also defines a schema that contain details of the data structure to be output to the egress connectors. The schemas may include instructions for handling failures of the schemas. The tenant 514 can define as many schemas as needed to establish dataflows. Schemas are managed via an API. A schema is used to check that the data has the correct data format and to organize the data into the data format, such as the JSON data format. A data pipeline specifies how to convert one schema format to another schema format and includes how the data is analyzed, aggregated, filtered, queried, and transformed. For example, one input data format can be transformed to two or more different data formats. Pipelines capture data schemas, complex streaming queries, and transformations in a concise, declarative, and type-safe fashion using a single programming language. For example, the programming language used to describe embodiments herein is Differential Datalog. (See, Differential Datalog ("DDlog"), by Leonid Ryzhyk and Mihai Budiu, VMware Research, Datalog 2.0, June 2019, https://research.vmware.com/publications/differential-datalog). A data pipeline is added for an ingress connector after a schema validation step and/or for an egress connector.

FIGS. 6A-6C shows examples of schemas and instructions to execute a data transformation. FIGS. 7A-7F shows examples of dataflows and setting of client credentials, access key, and metric parameters. Note that the schemas, a transformation function, instructions to deploy the transformation function, dataflows described below and APIs that are written in DDlog programming language.

FIG. 6A shows an example of a schema 600. The schema 600 identifies the name of the data, contains fields that describe the datacenter and the network that sends the data. For example, the network can be the network of the client responsible for sending the data, and the name of the source of the data. Note that "istring" is a type of data that stands for a string of characters that can represent a name, identifying information, type, or a state. The schema 600 identifies the type or structure of the data that will be received at the ingress service 404. In this example, "json" identifies a library 602. The schema 600 in section 604 indicates that the data will have an "SddcData" field. The schema 600 gives information about the "SddcData" 605, which contains information about a datacenter. The schema 600 gives information about the datacenter in section 606, which includes the names of zero or more networks of type "Network" of the datacenter. The schema 600 describes a set of values of type "VmData" for each network. Each VmData includes information about a virtual machine in the specific network. In section 608, each virtual machine is identified by five istring fields: id, name, state, powerState, and backing.

FIG. 6B shows an example of a schema 610 that is input by the data center tenant 514 to the schema manager 504. The schema 610 identifies the type of data that will be output from the egress service 510. In this example, the schema 610 identifies the format of the data to be output from the egress services 510 as "SkylineData" 612. Section 615 identifies the topology of the tenant's system, and section 616 identifies the service instance 616, and section 617 identifies the datacenter.

FIG. 6C shows an example of a sequence of commands for a data pipeline that are input by the tenant 514 to the schema manager 504. At step 618, the input data stream is given the name "VmcInputJason". At step 619, the output data stream is given the name "InsightOutputJson". At step 620, a second output stream named "Error" is declared, which is used to report parsing and conversion errors. At step 621, a parsing function, "from_json_string," is called to parse the input data (i.e., scan the input data to determine the data structure and whether the data format is erroneous), reading data from the input data stream VmcInputJson and writing the transformed data to the stream "ParsedData". At step 622, items that cannot be parsed are sent to the "Error" stream. At step 623, the data that was parsed successfully in step 621 is sent to a stream "InputData". At step 624, a transformation engine, as described below with reference to FIG. 8, calls a function "transform" to parse the input data into a different format. An example of a transformation function is described below with reference to FIG. 7I. The transformation function is applied to data items from the "InputData" data stream, and the result of the transformation (i.e., parsing) is written to the "ConversionResults" data stream. The transformation function executes the process of transforming, or parsing, the input data into the transformed data at a transformation engine of the transformation processor 508. At step 625, the data that could not be transformed in step 624 is sent to the same "Error" stream. At step 626, a function "to_json_string" is called to convert the "ConversionResults" data stream to the json format, which is sent to the "OutSerializationResult" data stream. This function converts the internal data structure of the program into a string representation that can be forwarded to the egress connector to send out to one or more receivers. At step 627, data that produced an error while being converted to json in step 626 is sent to the same "Error" data stream. All errors are reported via an error egress connector for receivers. At step 628, the data that is successfully converted to json is sent to the "InsightOutputJson" data stream, which is the output data stream of the computation, as identified in step 619.

FIG. 7A shows an example definition of a one-to-one dataflow that can be input by the tenant 514 to the schema manager 504. The definition includes a header 702 that identifies the data format of the command to create the dataflow as being JSON. The definition identifies the name of the dataflow 703 and includes an ingress connector section 704. The ingress connector section 704 identifies an example data pipeline named "demo-pipeline" 705 and properties of the input data to be placed on the data pipeline, such as a name for the input data given as "VmcInputJson" 706. In this example, the dataflow definition includes an egress connectors section 708 that directs output of the data stream processing service 402 to a receiver. The egress connectors section 708 includes the name 709 of the connector, the address 710 of the receiver that is to receive the transformed data (i.e., URL, receiver address, that has been configured by the tenant to receive the transformed output data), identifies 711 the data pipeline, and identifies the transformed data 712 with the name "InsightsOutputJson" 713. Note that the name of the input data "VmcInputJson" 706 appears in the schema 600 and the name of transformed data "InsightsOutputJson" 713 appears in the schema 600. Note that schema 600 is not the schema of the input. The schema 600 is the schema of the input data after processing. The input schema is json. Similarly, SkylineData 612 in schema 610 is not the output schema. The output schema is also json.

FIG. 7B is a flow diagram of the one-to-one dataflow show in FIG. 7A. In block 714, the ingress connector pushes the input data with name "VmcInputJson" to the data stream processing service 402. In block 715, the data stream processing system 402 buffers, validates, and transforms the input data into transformed data with the name "InsightsOutputJson". In block 716, the egress connector outputs the transformed data named "InsightsOutputJson" to a receiver.

The egress connectors section of a dataflow can be written to send transformed data to many egress connectors that in turn send the transformed data to corresponding receivers.

Figures 7C, 7D:
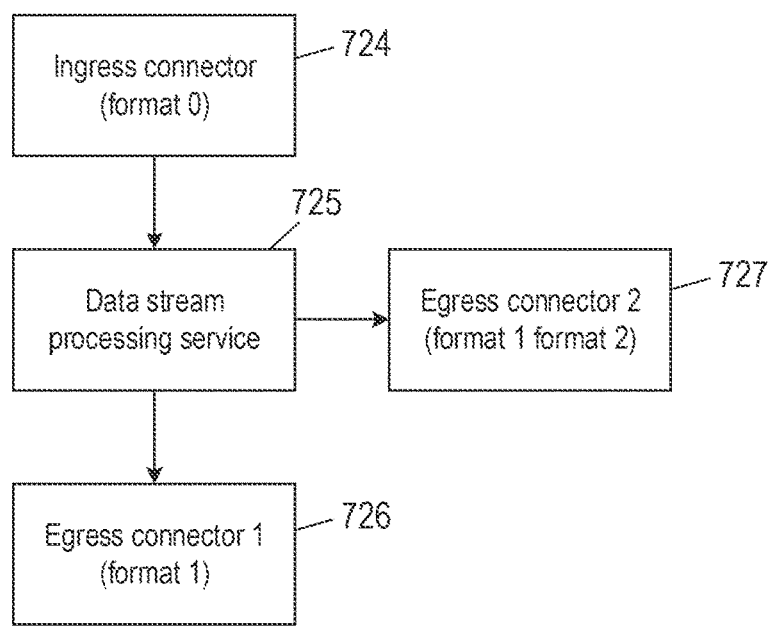

FIG. 7C shows an example of an egress connectors section 718 of a dataflow that receives input data in one format as described above with reference to FIG. 7A and outputs the transformed data produced by the data stream processing service 402 in two different formats to two different egress connectors. A first egress connector is identified as "egress_1" 719 and the corresponding receiver address is "https://<receiver>" 720. The first egress connector outputs transformed data in a first format named "OutputJson_1". A second egress connector is identified as "egress_2" 721 and the corresponding receiver address is "https://host.docker-.internal:5555/ingest2" 722. The second egress connector outputs transformed data in the first format named "OutputJson_1" and outputs transformed data in a second format name "OutputJson_2". Note that the second egress connector outputs transformed data in the first and second formats to the same receiver 722.

FIG. 7D is a flow diagram that illustrates the one-to-two dataflow show in FIG. 7C. In block 724, the ingress connector pushes input data in a format "InputJson_0" to the data stream processing service 402 represented by block 725. In block 725, the data stream processing system 402 buffers, validates, and transforms the input data into transformed data in the first format and transforms the input data into transformed data in a second format. The transformed data in the first format is identified as "OutputJson_1" and the transformed data in the second format is identified as "OutputJson_2". The data stream processing system 402 outputs the transformed data in the two different formats to two different egress connectors. In block 726, an egress connector outputs the transformed data "OutputJson_1" to the receiver 720. In block 726, an egress connector outputs the transformed data "OutputJson_1" and the transformed data "OutputJson-2" the receiver 722.

FIG. 7E shows an example of client credentials authorizing the tenant 514 to create one or more dataflows. The "authorization configuration" information is used by the egress service 510 in FIG. 5 to authorize a specific egress connector, such as egress connector 721 in FIG. 7C, against a central identify service and retrieve a token before the egress service 510 can send data to the receiver a URL, such the URL 722 in FIG. 7C. FIG. 7F shows an example of an access key that is entered by the tenant 514. The access key is an example of an authorization configuration for the tenant to access the system.

The data stream processing service 402 generates throughput and latency metrics for each dataflow. FIG. 7G shows an example of parameters of the metrics that can be set by the tenant 514. In FIG. 7G, the tenant has set a time interval between reporting metric values to every 60 seconds 728, the name of the egress connector 729, and the address of the receiver to receive the metrics 730.

Returning to FIG. 5, when the tenant 514 executes a dataflow, the schema manager 504 executes the operations represented by dashed directional arrows 528, 530, and 532 and starts execution of a streaming data pipeline. FIG. 5 shows a high-level view of a streaming data pipeline represented by directional arrows 534-540. The ingress service 404 ingests input data from one or more sources 516. The ingress services 404 buffers the data in a data queue, dequeues the input data, and sends the input data to the processing services gateway 506. The processing services gateway 506 validates the input data and sends the input data to the transformation processor 508. The transformation processor 508 transforms the input data into transformed data based on the schemas, the transformation function, and dataflow input by the tenant 514. The transformation processor 508 sends the transformed data to the processing services gateway 506 which forwards the transformed data to the egress service 510. The egress service 510 forwards the transformed data to the receivers 518 identified in the schema.

Figure 8:
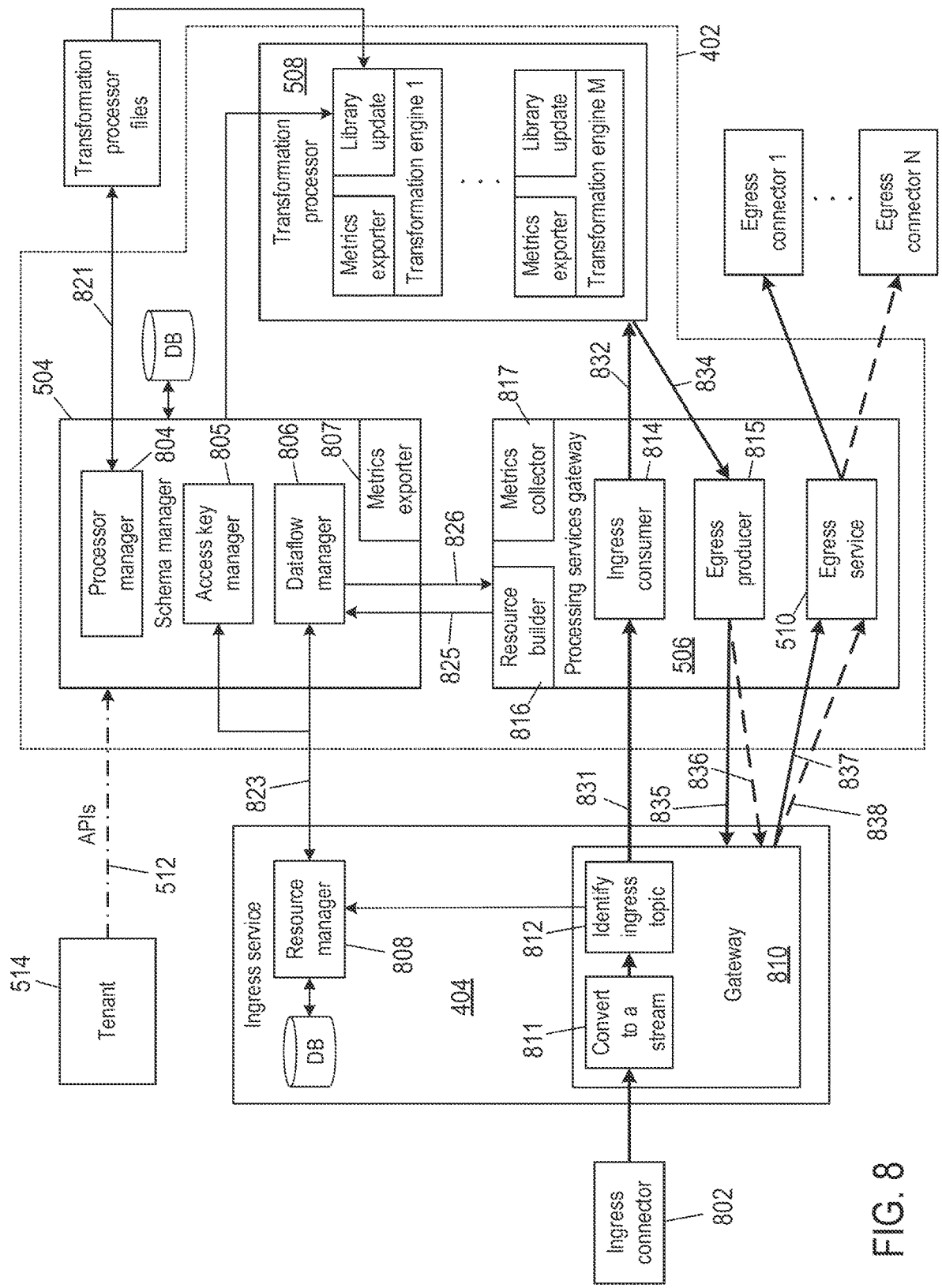
FIG. 8 shows examples of components of the architecture of the programmable data stream processing service shown in FIG. 5.

FIG. 8 shows examples of components of the ingress service 404, the schema manager 504, the processing services gateway 506, and the transformation processor 508. FIG. 8 also shows how data passes from an ingress connector 802 in streaming data pipelines to egress connectors identified as egress connectors n, where n=1, 2, . . . , N. As shown in FIG. 8, the schema manager 504 includes a processor manager 804, an access key manager 805, dataflow manager 806, and a metrics exporter 807. The processor manager 804 keeps track of dataflow processing executed by the processing services gateway 506 and the transformation processor 508. The access key manager 805 controls ingress service 404 access to the dataflow of the tenant 514. The dataflow manager 806 manages dataflow processes executed by the processing services gateway 506, such as starting the dataflow and updates. The ingress service 404 includes a resource manager 808 and a gateway 810. The gateway 810 converts data received from the ingress connect to a data stream in block 811 and identifies the ingress topic in block 812 and forwards the stream of data to the processing services gateway 506. The processing services gateway 506 includes an ingress consumer 814, an egress producer 815, and the egress service 510. The processing services gateway 506 includes a resource builder 816 and a metrics collector 817. For example, the metrics collector receives metrics produced by the metrics exporter 807 and metrics exporters of the transformation processor 508. The transformation processor 508 includes multiple separate transformation engines identified as transformation engine m, where m=1, 2, . . . , M. The transformation engines deploy different transformation functions across the set of transformation engines. For example, each transformation engine performs a particular transform function of the data received by the ingress connector 802. For example, at step 624 in FIG. 6C a transformation engine is called to parse data. Each transformation engine can send data to one or more of the egress connectors 1-N, as described below. Each transformation engine includes a metric exporter and a library update. The library update is service that allows updating of the code of a transformation engine while the transformation engine is running. Each transformation engine transforms (i.e., parses) the input data, which is input in one data format, and is transformed in another data format in accordance with a transformation function. Each transformation engine also monitors throughput and latency of the transformation performed by the transformation engine. Each transformation engine has an input throughput and an output throughput (e.g., bytes/min). Latency of transformation engine is the delay between receiving an input data and producing the corresponding output data. The throughput and latency metrics of each transformation engine are sent by the metrics exporters of the transformation engines to the metrics collector 817.

In FIG. 8, directional arrows 821-826 represent communications between the components of the ingress service 404, the schema manager 504, and the transformation processor 508. Arrow 821 contains code from tenants 514. Arrow 822 is the code compiled that is installed as one or more new transformation engines added to the transformation processor 508. Arrow 823 corresponds to communications between the resource manager 808 and the access key manager 805 and the dataflow manager 806. Arrow 824 represents the permission to install a new transformation engine in the transformation processor 508. Arrow 825 represents accounting of resources used by the ingress connector 802. Arrow 826 represents the permission to use resource if the resources are not exhausted.

In FIG. 8, directional arrows 831-840 represent streaming data pipelines from the ingress connector 802 to each of the egress connectors identified as egress connectors n, where n=1, 2, . . . , N. The ingress connector 802 sends the input data to the gateway 810 which converts the input data into a stream of data 811 and places the input data into an ingress topic 812, such as an ingress kafka topic. The ingress topics are derived from the dataflows, such as the ingress topics in the dataflows in FIGS. 7A and 7C. Identify ingress topic 812 receives data from the tenant 514 and associates an ingress topic for each data pipeline. An ingress topic is a category name to which data is stored and published. Ingress topics are divided into partitions that allow data pipeline processing with different topics to be parallelized by splitting the data pipelines according to particular topics. The ingress consumer 814 receives the data from the gateway 810 and sends the data to one or more transformation engines of the transformation processor 508 in accordance with the pipeline specified in the dataflows, such as the dataflows in FIGS. 7A and 7C. The ingress consumer 814 reads the data received from the ingress service 404 and stores the data in a persistent queue. The ingress consumer 814 sends the data to corresponding transformation engine in the transformation process 508 to transform the data. Each transformation engine transform data with a particular associated ingress topic. For example, the ingress consumer 814 receives data from many tenants, and uses the ingress topic associated with each dataflow to send the data to a corresponding transformation engine. As a result, the ingress consumer 814 determines the transformation engine to send each data item to based on the ingress topic associated with the data. Each stream of transformed data output from the different transformation engines is sent from the transformation processor 508 to the egress producer 815. The egress producer 510 receives each stream of transformed data output from the different transformation engines of the transformation processor 508 and separately sends each stream to the gateway 810. The gateway 810 receives the streams of transformed data from the egress producer 815 and forwards the transformed data to the egress service 510. The egress service 510 sends each stream of transformed data to corresponding egress connectors. For example, service 510 sends the transformed data produced by the transformation engine 1 to egress connector 1 and sends the transformed data produced by the transformation engine N to egress connector N.

Figure 9:
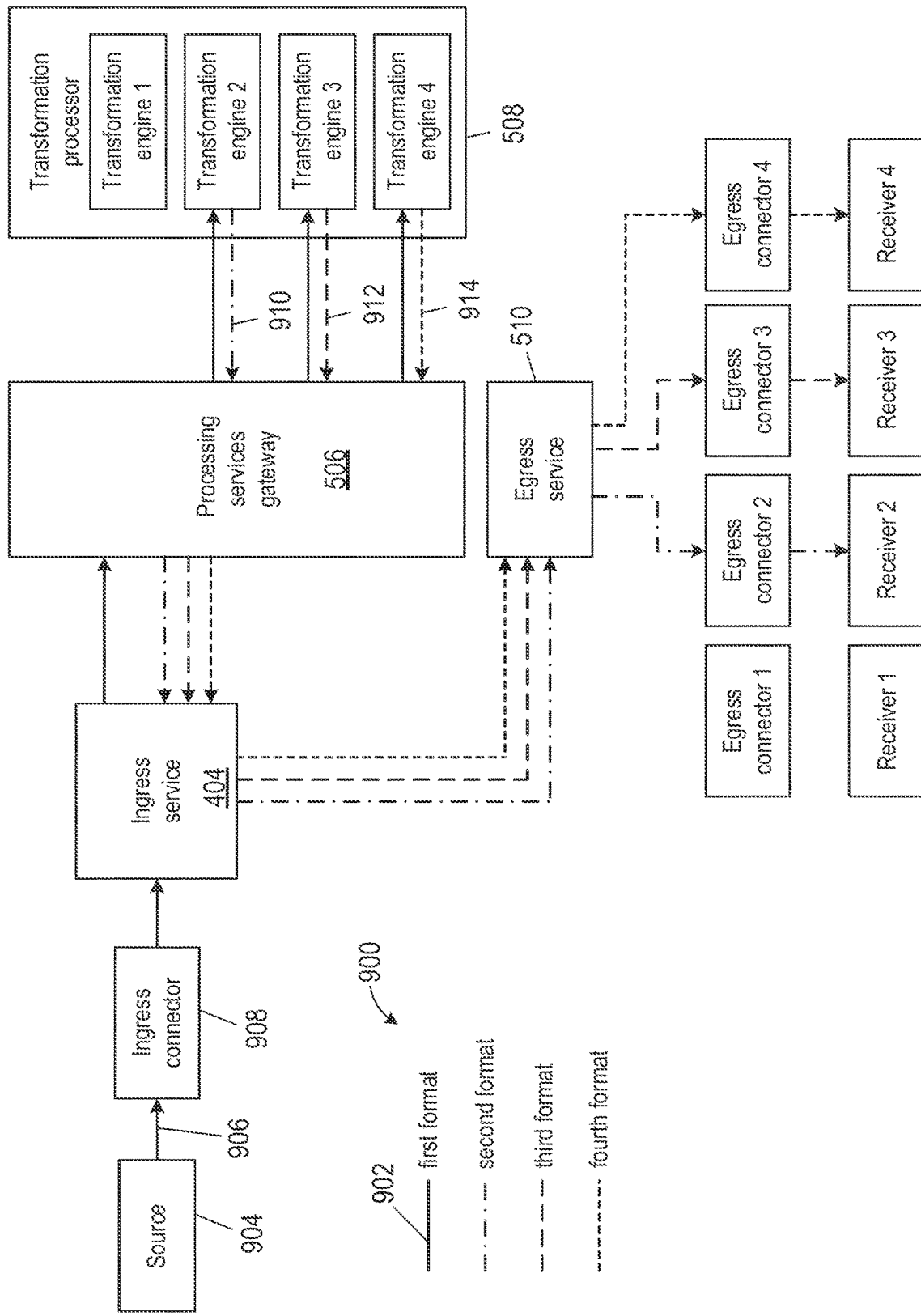
FIG. 9 shows an example of operations performed by an ingress service, a processing services gateway, and a transformation processor that execute one-to-many dataflows.

FIG. 9 shows an example of the ingress service 404, the processing services gateway 506, and the transformation processor 508 executing one-to-many dataflows. FIG. 9 includes a table 900 that identifies four different data formats represented by differently patterns. For example, solid line 902 represent data in a first format. A source 904 produces data in the first format identified by solid arrows, such as solid arrow 906. Ingress connector 908 receives the data in the first format and inputs the data to the ingress service 404. The ingress service 404 forwards the data to the processing services gateway 506 as described above with reference to FIG. 8. In this example, the transformation processor 508 includes four transformation engines m, wherein m=1, 2, 3, and 4. Transformation engines 2-4 have been programmed to accept data in the first format. The processing services gateway sends the data in the first format to each of the transformation engines 2-4. Transformation engine 2 transforms data from the first format to the second format and returns the same data in the second format as represented by directional arrow 910. Transformation engine 3 transforms data from the first format to the third format and returns the same data in the third format as represented by directional arrow 912. Transformation engine 4 transforms data from the first format to the fourth format and returns the same data in the fourth format as represented by directional arrow 914. The processing services gateway 506 forwards the transformed data output from the transformation engines 2-4 to the egress service 510 in accordance with instructions in the output schema as described above with reference to FIG. 8. In this example, the egress service 510 sends the data in the second format to egress connector 2, sends the same data in the third format to egress connector 3, and sends the same data in the fourth format to egress connector 3. The egress connectors 2-4 send the data to corresponding receivers 2-4 for processing or data storage.

Figure 10A:
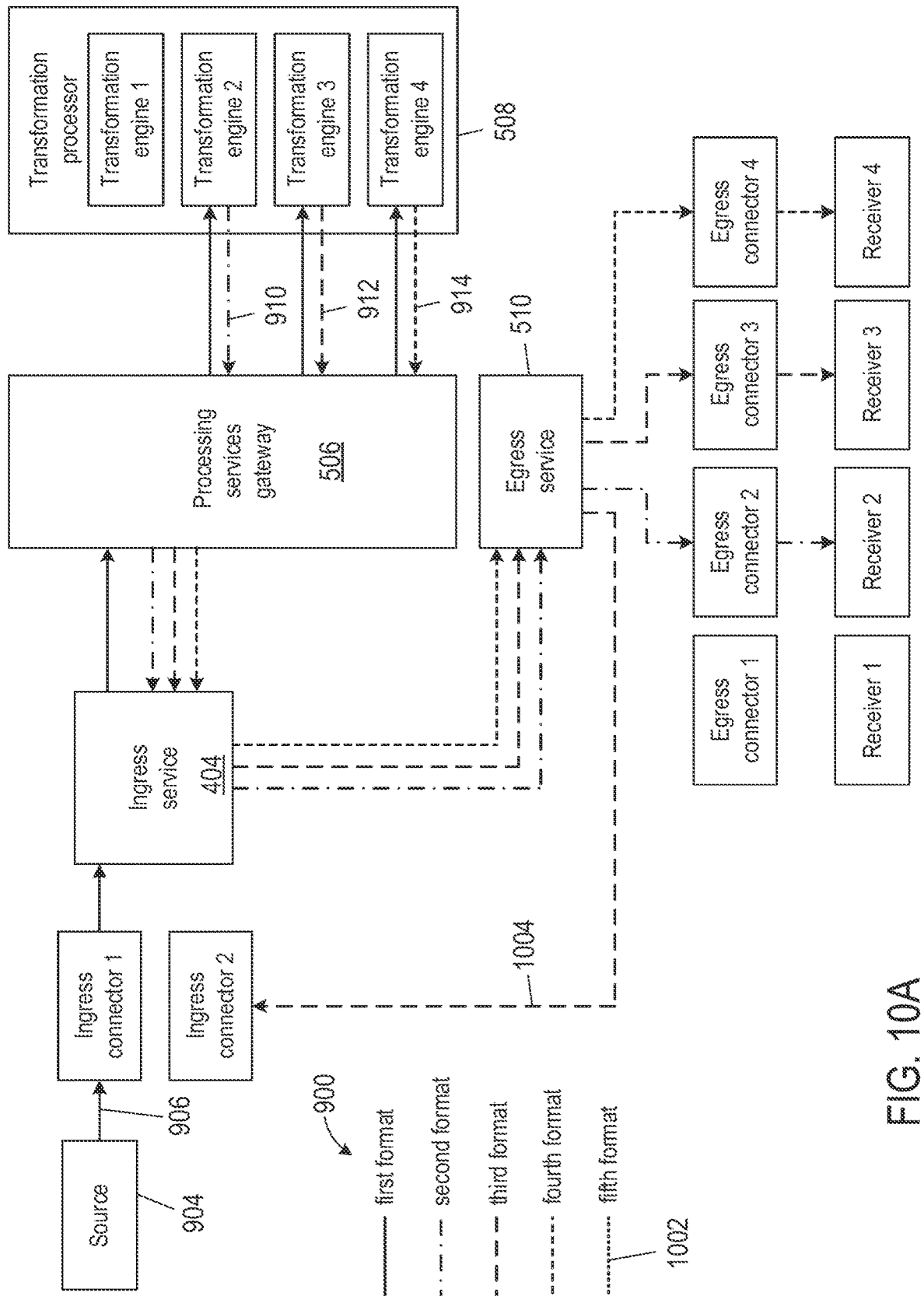
FIGS. 10A-10B show an example of operations performed by an ingress service, processing services gateway, and a transformation processor that execute many-to-many dataflows by feeding transformed data back into the ingress service for transformation to another data format.
Figure 10B:
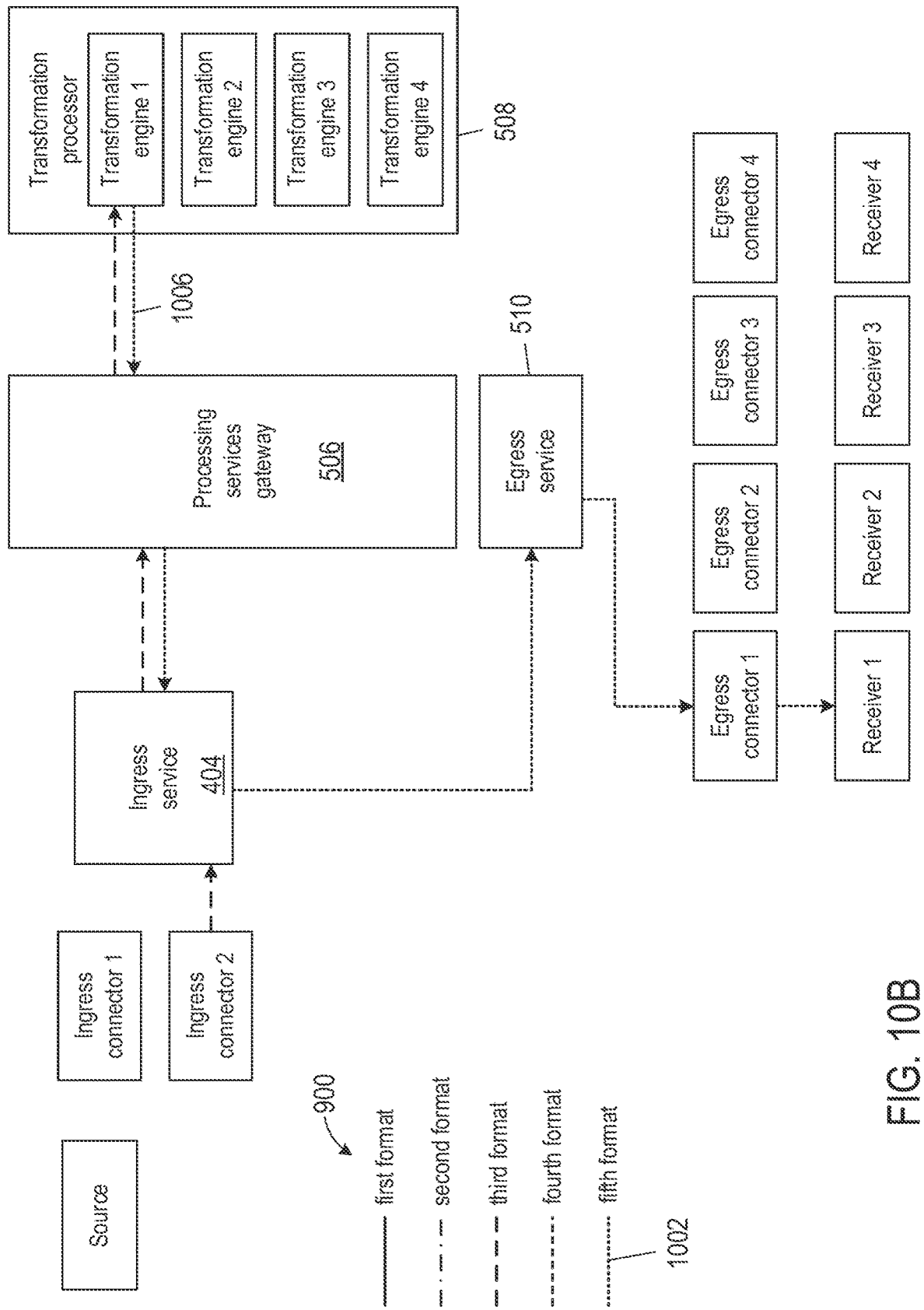

In another example, suppose transformation engine 1 in FIG. 9 is programmed to parse data from the third format to a fifth format that can be processed by receiver 1. FIGS. 10A-10B show an example of the ingress service 404, the processing services gateway 506, and the transformation processor 508 executing many-to-many dataflows by feeding transformed data back into the ingress service for transformation to another data format. In FIG. 10A, the table 900 has been expanded to include a fifth data format represented by dotted line 1002. The source 904 produces data in the first format as indicated by solid arrow 906. A first ingress connector 1 receives the data in the first format and inputs the data to the ingress service 404. The ingress service 404, the processing services gateway 506, the transformation engines 2-4 of the transformation processor 508, and egress service 510 send the data into the second, third, and fourth formats to the receives receivers 2-4 as described above with reference to FIG. 9. In this example, the output schema includes instructions for the processing services gateway 506 to output the data in the third format to a second ingress connector 2 as indicated by directional arrow 1004. In FIG. 10B, the data in the third format is forwarded to the ingress service 404. The ingress service 404 forwards the data to the processing services gateway 506 as described above with reference to FIG. 8. In this example, the processing services gateway 506 sends the data in the third format to the transformation engine 1, which transforms the data from the third format to the fifth format and returns the same data in the fifth format as represented by directional arrow 1006. The processing services gateway 506 forwards the transformed data output from the transformation engine 1 to the ingress service 404. In this example, the egress service 510 sends the data in the fifth format to egress connector 1, which sends the data in the fifth format to corresponding receiver 1 for processing or data storage. The dataflow in FIGS. 10A-10B shows how data can be repeatedly sent back into the processing services gateway 506, the transformation processor 508, and the egress service to repeatedly transform, or parse, the same data into different formats.

Figure 11:
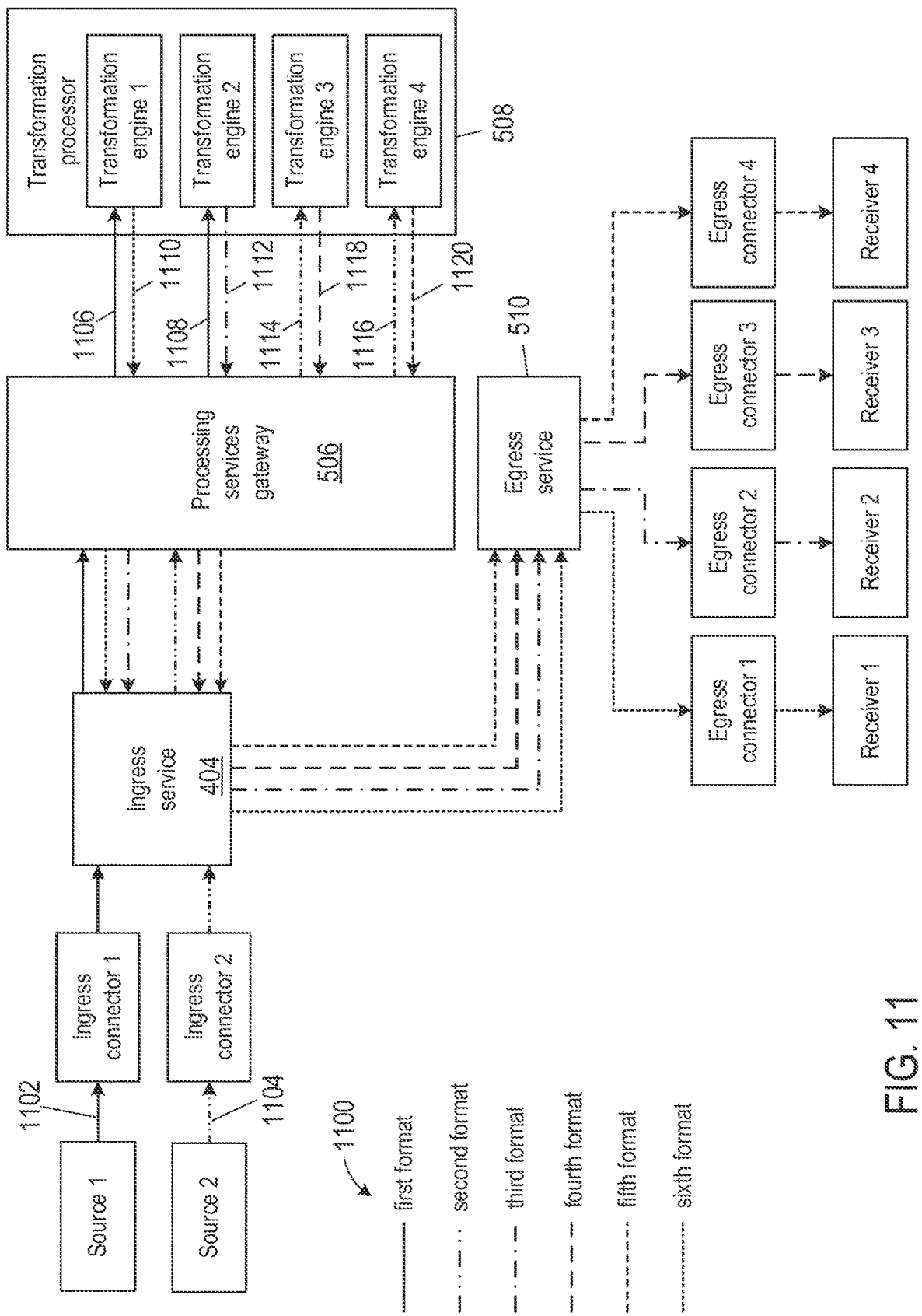
FIG. 11 shows an example of operations performed by an ingress service, a processing services gateway, and a transformation processor that executes many-to-many dataflows.

FIG. 11 shows an example of the ingress service 404, the processing services gateway 506, and the transformation processor 508 executing many-to-many dataflows. FIG. 11 includes a table 1100 that identifies six different data formats represented by differently patterns. In this example, a Source 1 produces data in the first format identified by arrow 1102, and Source 2 produces data in the second format identified by dashed-double arrow 1104. Ingress connector 1 receives data in the first format, and ingress connector 2 receives data in the second format. The ingress service 404 receives data in the first and second formats and forwards the data to the processing services gateway 506. In this example, the transformation engines 1 and 2 receive data in the first format as indicated by arrows 1106 and 1108. Transformation engine 1 transforms data in the first format into data in the sixth format as indicated by dotted arrow 1110. Transformation engine 2 transforms data in the first format into data in the third format as indicated by dotted arrow 1112. The transformation engines 3 and 4 receive data in the second format as indicated by arrows 1114 and 1116. Transformation engine 3 transforms data in the second format into data in the fourth format as indicated by dashed arrow 1118. Transformation engine 4 transforms data in the second format into data in the fifth format as indicated by dotted arrow 1120. The processing services gateway 506 forwards the transformed data output from the transformation engines 1-4 to the egress service 510 in accordance with instructions in the output schema as described above with reference to FIG. 8. In this example, the egress service 510 sends the transformed data egress connectors 1-4, which forward the transformed data corresponding receivers 1-4 for consumption by recipient systems or services.

The data stream processing service 402 offers a number of advantages over conventional streaming data pipelines. The data stream processing service 402 provides continuous data processing, which decreases latency at every step along the data pipelines and enables tenants and systems to use transformed data in real time. With this kind of continuous processing, security applications can target and resolve external threats on a timelier basis. In terms of decision-making, managers and analysts can make better business decisions based on current real time data rather than relying on data that is hours or days old. Successful data-driven decision making relies on the relevance of the data being analyzed, and just a few hours of lag time can make a major difference for organizations that must operate in real time.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A computer implemented data stream processing service for streaming data input from a source to one or more receivers of a data center in data pipelines, the processing service comprising:

a schema manager that receives commands from a tenant of the data center, the commands contain instructions for parsing the data into one or more data formats and instructions for sending the data in the one or more data formats to the one or more receivers;

a processing services gateway that validates the data and sends the data to a transformation processor;

a transformation processor that receives the data and parses the data into the one or more data formats in accordance with the instructions for parsing the data into one or more data formats; and an egress service that outputs the data in the one or more data formats to the one or more receivers in accordance with the instructions for sending the data in the one or more data formats to the one or more receivers, each receiver receiving the data in a data pipeline in one of the one or more formats.

2. The processing service of claim 1 further comprises an ingress service that converts the input data into a stream of data, identifies an ingress topic of the data, buffers the input data in a data queue, dequeues the input data, and sends the input data to the processing services gateway.

3. The processing service of claim 1 wherein the schema manager receives the instructions and directs an ingress service to receive the data, directs the processing services gateway to validate the input and send validated data to the transformation processor, and directs the transformation processor to parse the input data into the one or more formats in accordance with the instructions.

4. The processing service of claim 1 wherein the processing services gateway comprises:
an ingress consumer that receives the data from the ingress service and sends the data to one or more transformation engines of the transformation processor in based on ingress topics of the data;
egress producer receives each stream of transformed data output from the transformation engines and send each stream of transformed data separately to the ingress service; and
an egress service that receives the streams of transformed data and sends the transformed data to corresponding egress connectors.

5. The processing service of claim 1 wherein the transformation processor comprises one or more transformation engines, each transformation engine is configured to receive data in a first data format and parses the data into a second data format.

6. The processing service of claim 1 wherein the egress service that receives the data in the one or more formats and outputs the data to one or more egress connectors that forward the data in the one or more formants to the one or more receivers.

7. The processing service of claim 1 wherein the egress service forwards the data output in one of the data formats to an ingress connector that inputs the data to the processing service for parsing into another data format in accordance with the instructions.

8. A process, stored in one or more data-storage devices and executed using one or more processors of a computer system, for routing data in data pipelines from one or more sources to one or more receivers of a data center, the process comprising:
receiving commands for creating dataflows from a tenant of the data center;
sending data input from the one or more sources to one or more transformation engines in accordance with the commands, each transformation engine parsing the data output from one of the one or more sources into a different data format that is different from the data formats produced by the other transformation engines;
sending the data in the different data formats output from each of the transformation engines to one or more egress connectors; and
forwarding the data from the one or more egress connectors to the one or more receivers.

9. The process of claim 8 wherein receiving commands from the tenant of the data center tenant comprises receiving schema, instructions to execute the pipelines in dataflows, and the dataflows in an application programming interface.

10. The process of claim 8 wherein the commands contain instructions for parsing the data into one or more data formats and instructions for sending the data in the one or more data formats to the one or more receivers.

11. The process of claim 8 wherein sending data input from the one or more sources to one or more transformation engines in accordance with the commands comprises:
validating the data and sending the data to one or more transformation engines of a transformation processor based on ingress topics associated with the data;
parses the data into the one or more data formats at the one or more transformation engines in accordance with the instructions; and
outputting the data in the one or more data formats to the one or more receivers in accordance with the instructions for sending the data in the one or more data formats to the one or more receivers, each receiver receiving the data in a data pipeline in one of the one or more formats.

12. The process of claim 8 further comprises:
converting the data into a stream of data;
identifying an ingress topic of the data;
buffering the data in a data queue;
dequeuing the data; and
sending the data to the one or more transformation engines.

13. A computer system for routing data in data pipelines from one or more sources to one or more receivers of a data center, the computer system comprising:
one or more processors;
one or more data-storage devices; and
machine-readable instructions stored in the one or more data-storage devices that when executed using the one or more processors controls the system to perform operations comprising:
receiving commands for creating dataflows from a tenant of the data center;
sending data input from the one or more sources to one or more transformation engines in accordance with the commands, each transformation engine parsing the data output from one of the one or more sources into a different data format that is different from the data formats produced by the other transformation engines;
sending the data in the different data formats output from each of the transformation engines to one or more egress connectors; and
forwarding the data from the one or more egress connectors to the one or more receivers.

14. The system of claim 13 wherein receiving commands from the tenant of the data center tenant comprises receiving schema, instructions to execute the pipelines in dataflows, and the dataflows in an application programming interface.

15. The process of claim 13 wherein the commands contain instructions for parsing the data into one or more data formats and instructions for sending the data in the one or more data formats to the one or more receivers.

16. The system of claim 13 wherein sending data input from the one or more sources to one or more transformation engines in accordance with the commands comprises:
validating the data and sending the data to one or more transformation engines of a transformation processor based on ingress topics associated with the data;
parsing the data into the one or more data formats at the one or more transformation engines in accordance with the instructions; and
outputting the data in the one or more data formats to the one or more receivers in accordance with the instructions for sending the data in the one or more data formats to the one or more receivers, each receiver receiving the data in a data pipeline in one of the one or more formats.

17. The system of claim 13 further comprises:
converting the data into a stream of data;
identifying an ingress topic of the data;
buffering the data in a data queue;
dequeuing the data; and
sending the data to the one or more transformation engines.

* * * * *